United States Patent [19]
Hamlin et al.

[11] Patent Number: 4,835,459
[45] Date of Patent: May 30, 1989

[54] AUTOMATIC FAULT INSERTION SYSTEM (AFIS)

[75] Inventors: Jack W. Hamlin, Fullerton; Bradley C. Logan, Placentia; William A. Richards, Anaheim; Maurice T. Sanders, Fullerton; Robert C. Wyckoff, Sugar Loaf, all of Calif.

[73] Assignee: Hughes Aircraft Company, Los Angeles, Calif.

[21] Appl. No.: 863,910

[22] Filed: May 16, 1986

[51] Int. Cl.$^4$ .......................................... G01R 31/28
[52] U.S. Cl. ...................................... 324/73 R; 371/20
[58] Field of Search ........................ 324/73 R, 73 AT; 371/20, 25, 15

[56] References Cited

U.S. PATENT DOCUMENTS

| | | | |
|---|---|---|---|
| 4,459,695 | 7/1984 | Barratt et al. | 324/73 R |
| 4,481,628 | 11/1984 | Pasquinelli | 324/73 R |
| 4,703,484 | 10/1987 | Rolfe et al. | 324/73 R |
| 4,709,366 | 11/1987 | Scott et al. | 324/73 R |

Primary Examiner—Ernest F. Karlsen
Attorney, Agent, or Firm—A. W. Karambelas

[57] ABSTRACT

A system (20) automatically selects electrical circuits (22) of an electrical unit (24) to be tested, inserts any of a plurality of types of electrical fault signals into the selected circuits and controls the inserted fault signals in accordance with a set of preprogrammed instructions. The fault signals are inserted through an electrical connection adapter (36) into the unit's circuits by a programmed controller. The programmed controller includes a host computer (32) for storing data corresponding to the types of faults to be inserted and a microprocessor (52) for controlling the insertion of the fault signals into the unit under test. A threshold detection circuit (100, 102) monitors the voltage of the inserted fault signals and records an error if the signals are outside preselected limits. Selector means (96, 98) are provided for selecting any of a plurality of fault signal current levels. A timer circuit (60) removes all fault signals after a preselected time interval. A counting circuit (90, 92) limits the number of fault signals that can be inserted into the unit to avoid damage to sensitive circuits of the unit under test (24).

25 Claims, 8 Drawing Sheets

AUTOMATIC FAULT INSERTION SYSTEM (AFIS)

TECHNICAL FIELD

The present invention broadly relates to systems for testing the integrity and electrical performance of the circuits of an electrical unit, and deals more particularly with a system for automatically inserting electrical fault signals into the unit under test for the purpose of determining the performance of test diagnostics employed to test the circuits of a unit under test.

BACKGROUND ART

Electrical products having complex electrical circuits, particularly digital systems, require extensive testing to assure proper performance and reliability. Specialized testers, sometimes referred to as test controllers, are normally employed to test the unit's electrical circuits. Such testers may employ a computer-based system having test sofware or test firmware programmed to perform various types of tests on the circuits. The test software or firmware is sometimes referred to as the fault detection/fault location (FD/FL) diagnostics.

In the past, verification of the FD/FL diagnostics has been performed by manually introducing electrical fault signals into the unit under test, and then verifying that the FD/FL properly identifies or records such faults. This manual approach suffers from several deficiencies. First, manual insertion of the faults requires the presence of an operator, is time consuming and quite slow. Manual fault insertion is also particularly subject to human error if an improper fault signal is inserted and may also subject sensitive circuits to damage if the applied current levels are too high. Moreover, the hand-held equipment sometimes used to insert the fault can lack the drive current to pull strong signals to faulty logic states, thereby resulting in invalid fault codes. Finally, it was difficult to correlate performance of the FD/FL executed by the test controller with the particular circuits being tested. Fault data, for example, was often erroneously manually transcribed. As a result of these deficiencies, fault insertion for the purpose of verification of the FD/FL was sometimes given a low priority, or incomplete verification was performed, or was not employed at all, thereby compromising the reliability of the FD/FL test diagnostics.

SUMMARY OF THE INVENTION

According to the present invention, a system is provided for automatically introducing faults into an electrical unit under test (UUT). The system has a plurality of circuits which comprises a programmed controller, which is removably connected with the UUT circuits and is operative to automatically introduce fault signals into selected ones of UUT circuits in accordance with a preprogammed set of instructions. The system introduces fault signals into the UUT circuits through an electrical connector test adapter (TA). The system includes a host computer for storing data corresponding to the types and conditions of faults to be inserted into the various UUT circuits and includes a microprocessor-based computer unit for controlling the insertion of the fault signals into the circuits of the unit under test. A threshold detection circuit monitors the voltage of the inserted fault signals and records an error if the signal is outside preselected limits catalogued in a data file stored in a host computer. A circuit is provided for selecting any of a plurality of fault signal current levels. A timer circuit removes all of the fault signals after a preselected time interval in order to avoid potential damage to the circuits of the unit under test. The fault signal type, current level, and timer information for each fault is stored in the host computer in the form of a data file. Damage to the circuits of the unit under test and to the circuits of the automatic fault insertion system is also prevented by a hardware counting circuit which limits the number of faults that can be simultaneously inserted into the circuits. The system cooperates with the test controller to provide formatted outputs which reveal the performance of the test software.

DESCRIPTION OF THE PREFERRED EMBODIMENTS

Figure 1:
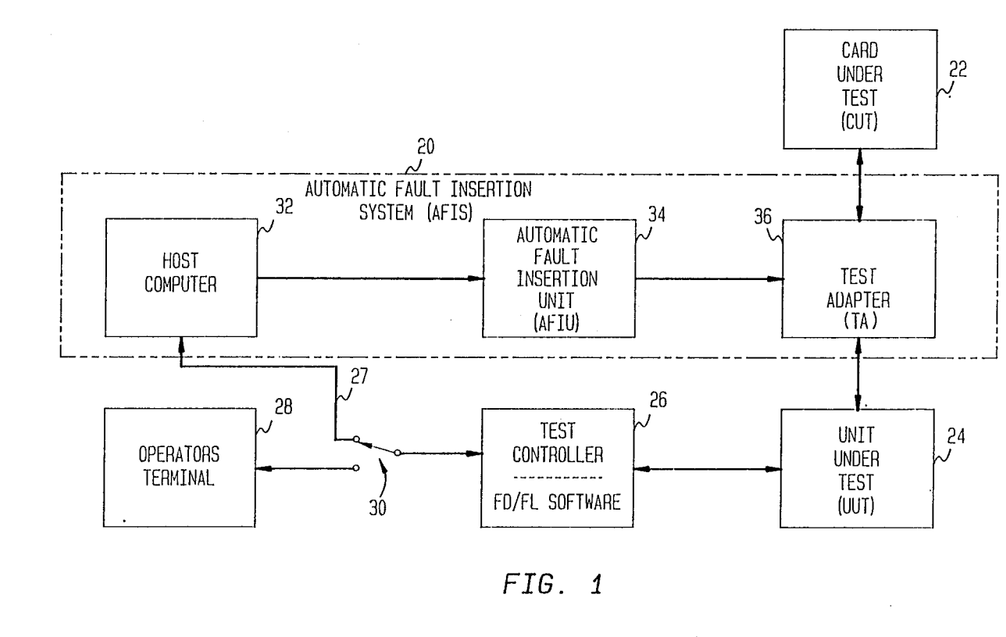
FIG. 1 is an overall block diagram showing the relationship of the automatic fault insertion system of the present invention to a test controller and a unit whose circuits are to be tested.

Referring first to FIG. 1, the present invention broadly relates to an automatic fault insertion system (AFIS), generally indicated within the broken line 20, for introducing electrical signals simulating faults into any of a plurality of electrical circuits of a unit under test (UUT) 24. The UUT 24 may comprise any type of electrical device, typically a digital system which has electrical circuits of the type including interconnections allowing portions of the circuits to be easily removed. For example, complex electrical circuits typically include integrated circuits mounted by way of a dual in-line package (DIP) on a printed wiring board, and in many cases include complex circuits defined on printed circuit cards which have electrical pins or contacts along one edge thereof. These cards are removably installed in the UUT 24 to facilitate repair and replacement. For illustrative purposes, it is assumed that the UUT 24 includes one or more printed circuit cards, which in FIG. 1 is indicated as a card under test (CUT) 22. The interface of the AFIS 20 to the UUT 24 is accomplished with a test adaptor (TA) 36 which is electrically interposed between the CUT 22 and the UUT 24. Typically, the TA 36 would include two sets of pins or connections for connecting the AFIS 20 with the standard input/output pins or contacts of the CUT 22 and UUT 24. However, other versions of the TA 36, for example, are capable of connecting directly to discrete electronic devices on the CUT 22 or UUT 24, and also to backplane intrawiring of the UUT 24.

The circuits of the UUT 24 are tested by a test controller 26 specially configured to perform a series of tests on each of the UUT 24 electrical circuits and to generate reports regarding the functioning of such circuits. The test controller 26 includes fault detection/- fault location diagnostic software which analyzes the test data and both detects and locates electrical faults in the UUT 24. The test controller 26 is a device well known in the art which exists in many different commercially available forms such as an ANS/UYK-20 computer, consequently the details thereof need not be given herein. An objective of the present invention is to provide an automatic system for testing and verifying the proper operation of the FD/FL test diagnostic. In the absence of such verification, it would not be known whether faults could be detected and reported, or whether faults reported by the test controller 26 were the result of malfunctions of the UUT 24 or of the FD/FL diagnostics employed by the test controller 26.

The AFIS 20 includes an automatic fault insertion unit (AFIU) 34 and a host computer 32. The host computer 32 may comprise, for example, a small commercially available personal computer which is programmed to select the particular pin or circuit of the UUT 24 to which the fault is to be applied, as well as the type and level of the fault signal which is applied. Additionally, as will be discussed later in more detail, the host computer 32 is programmed to select a threshold voltage level which is to be searched for during the application of the fault so that the AFIU 34 can verify that a fault signal of the threshold value has in fact been applied throughout the test period. The AFIS 20 is connected with the test controller 26 by a communication line 27 which may comprise a military standard RS-232 interface to permit data transmission. The test controller 26 delivers signals to the AFIS 20 through a switch 30 so that the operations of the test controller 26 and AFIS 20 can be coordinated. For example, an initial pass code signal is delivered from the test controller 26 to the host computer 32, indicating that the test controller 26 is operational and is ready to invoke the FD/FL to test the UUT 24. Following receipt of the pass code, AFIS 20 inserts a predetermined fault and instructs the test controller 26 to test the UUT 24. The test controller 26 invokes the FD/FL, determines the existence of a fault, and sends the appropriate fault code to AFIS 20. The AFIS 20 awaits the receipt from the test controller 26 of the fault code which defines the type and location of the fault which is detected by the test controller 26. In the event that the fault code is not received, the AFIS 20 records no fault code and proceeds to the next predetermined fault. However, if the fault code is received, the AFIS 20 reads the next N characters following the fault code, stores these characters for later analysis, releases the inserted fault and commences insertion of the next fault. The switch 30 allows the test controller 26 to be alternatively connected by the operator either to the AFIS 20 during automatic operation or to an operator terminal 28 which may comprise a typical data terminal allowing input and output of data which controls the test controller 26.

The AFIU 34 receives instructions from the host computer 32 and delivers fault insertion signals to the TA 36, which then functions to introduce these faults at the circuit interconnection between the CUT 22 and UUT 24. As will be discussed later in more detail, the AFIS 20 monitors the inserted fault signal and verifies that a valid fault is held throughout the entire execution of the fault detection/fault location diagnostic program by the test controller 26. For example, in connection with the testing of some types of circuits, a fault signal of the required magnitude may not be held for the entire duration of the fault insertion process. The AFIS 20 includes a built-in voltage threshold detection circuit which constantly monitors the faulted signal line throughout the test period and records an error if the voltage level rises above or falls below specified levels, thus assuring the validity of the fault inserted and of the fault codes which are returned from the test controller 26. The AFIS 20 includes a number of safety features which reduce or eliminate the possibility of hardware degradation and destruction in the UUT 24 as a result of the fault insertion process. For example, any of a plurality of fault signal current levels may be chosen so as to apply the proper current level to the individual circuits under test. This substantially reduces the possibility of damage to the circuit as a result of current drain on output drivers during the fault insertion process. Circuitry is provided in the AFIS 20 which precludes the application of more than a preselected number of faults to the UUT 24 at any one time. Again, this feature protects the circuits of the UUT 24 from current overloads, as well as the AFIS 20 circuitry itself. Finally, the AFIS 20 includes a time-out circuit which automatically removes all faults after a preselected time interval. This programmable feature prevents damage to those components of the UUT 24 which can withstand a fault for only a limited period of time.

After the fault insertion procedure has been completed, the AFIS 20 correlates the fault code data received from the test controller 26 and produces formatted reports describing the results of the fault insertion process to allow quick and accurate analysis of the performance of the FD/FL diagnostic programs.

Figure 2:
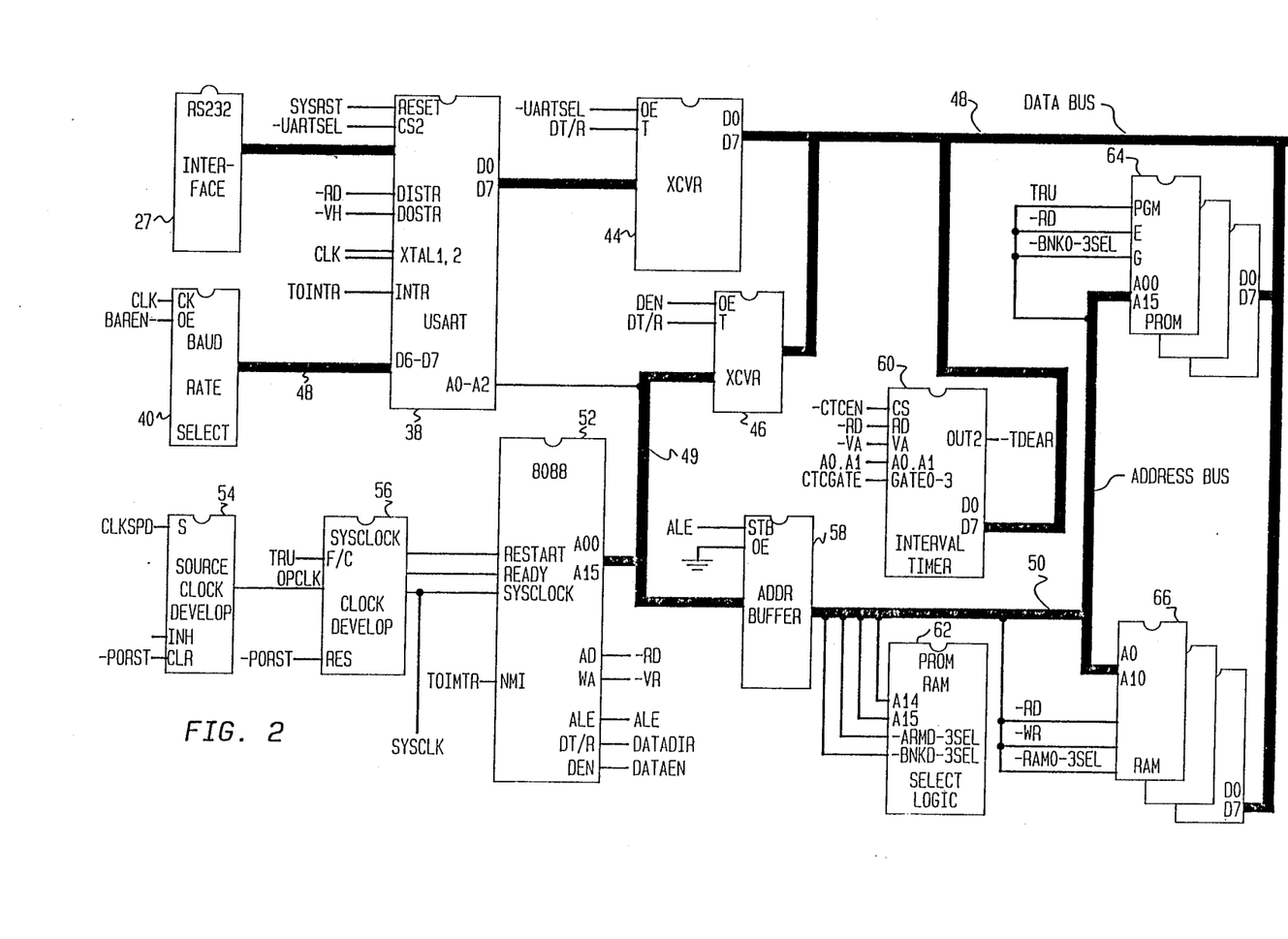
FIGS. 2 and 3, taken together, form a more detailed block diagram of the fault control logic and fault selection logic which form a portion of the automatic fault insertion unit.
Figure 3:
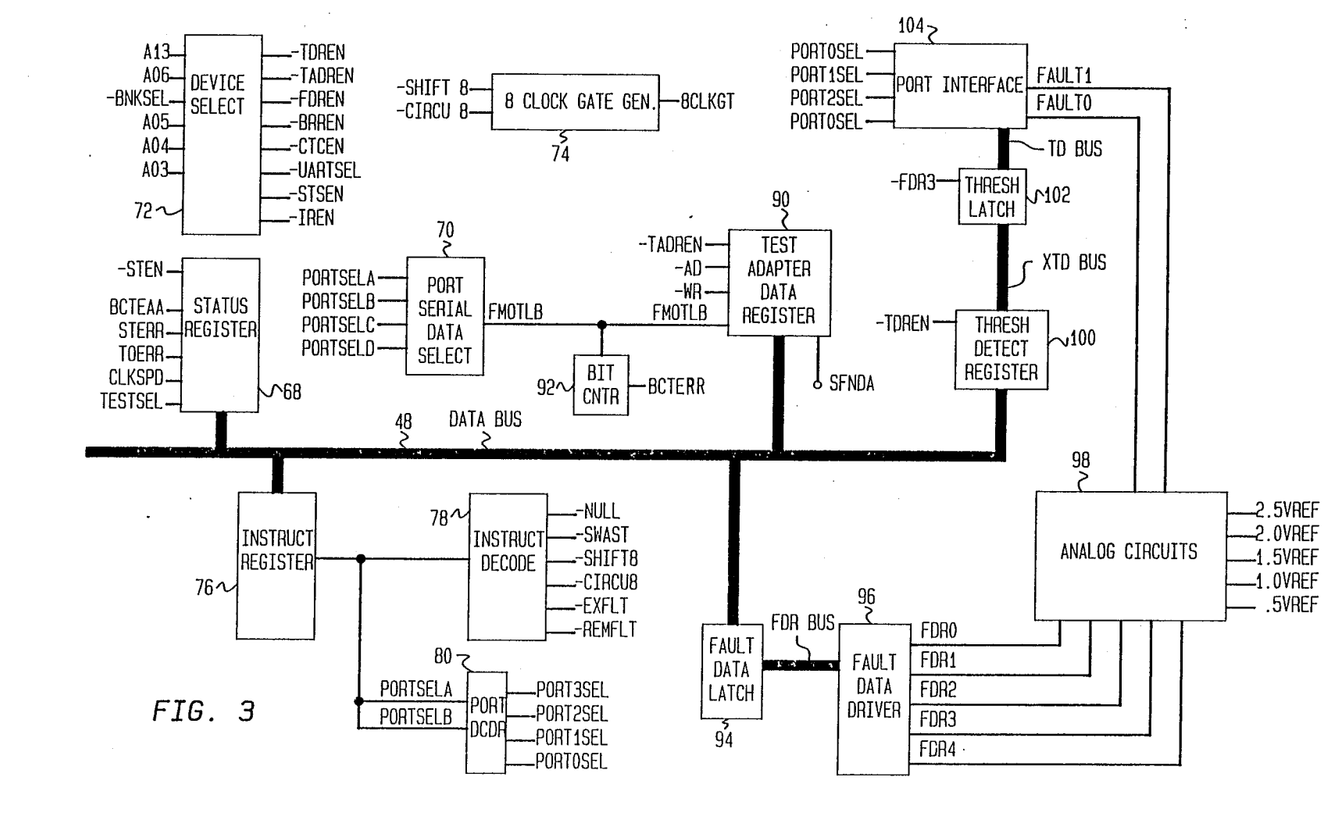

The AFIU 34 broadly includes a fault control logic circuit, shown in FIG. 2, and a fault selection logic circuit shown in FIG. 3. The fault control logic circuit receives and interprets commands from the host computer 32 which determines the types of operations to be performed by the AFIU 34. The fault control logic also returns information to the host computer 32 relating to the current operation of the AFIU 34 and the status of the current fault insertion sequence.

The fault selection logic shown in FIG. 3 performs various operations required to actually set up a fault insertion. This latter-mentioned circuit also functions to collect the sensed data for the highest or lowest voltage level achieved during the fault insertion and transmits this level on command to the fault control logic circuit shown in FIG. 2.

Referring particularly to FIG. 2, the fault control logic includes a conventional, universal asynchronous receiver transmitter (UART) 38 which provides a serial link with the RS-232 interface 27. The UART 38 controls parallel data transmission to and from a data transceiver 44, which may comprise, for example, an 8286 Intel microcircuit of the type shown on pages 3–5755 of the Microsystem Component Handbook, Vol. I, 1984, Copyright 1983 by Intel Corporation. It should be noted that other equivalent microcircuits could be used for this circuit and for other circuits listed herein. The UART 38 provides control signals to both the remaining components of the circuit shown in FIG. 2 and to the RS-232 interface 27 to facilitate data transmission. The baud rate of this data transmission is determined by conventional baud rate selector 40 which may include a plurality of switches (not shown) which may be manually operated to select the data transmission rate. The data transceiver 44 functions to control the flow and direction of data from and to the UART 38 and the data bus 48, such as an Intel 8251 microcircuit of the type disclosed in the previously referenced book.

A data latch transceiver 46, which may also comprise an Intel microcircuit, buffers information on the data bus 48 to a microprocessor 52 which may comprise an Intel 8088. Thus, information flow on the data bus 48 is controlled by the transceivers 44 and 46.

During a receive cycle, information from the host computer 32 relating to the pin or circuit number, the type and signal level of the fault and the threshold level to be searched for are put onto the data bus 48 and are stored, under control of the microprocessor 52, in a RAM 66 (random access memory) of a plurality of RAMs. The RAM 66 may comprise a 2KX8 static memory which receives addresses on an address bus 50, through an address buffer 58, from the microprocessor 52. Following receipt of the initial data from the host computer 32, the next command received from the host computer 32 is an instruction causing the fault to be set up by the fault selection logic shown in FIG. 3. These instructions are delivered under control of the microprocessor 52 to an instruction register 76 (FIG. 3) via the 8-bit data bus 48.

The microprocessor 52 has a sixteen-bit address bus 49. The data bus 48 is an eight bits bus which is a function of the sixteen-bit address bus 49. The microprocessor 52 is driven by a pair of clocks 54, 56 on a 33 percent duty cycle to provide optimized internal timing. The microprocessor 52 receives a READY signal which constitutes an acknowledgement from the addressed memory or input/output device that it will complete a data transfer. The program under which the microprocessor 52 operates is stored in a PROM 64 (programmable read only memory) of a plurality of PROMs which can be AMD Corporation 27128 microcircuits of the kind listed in the Bipolar Microprocessor Logic Interface Data Book, copyright 1981 by Advanced Microdevices, Inc. A sixteen-bit address buffer 58 temporarily latches address information from the microprocessor 52 until strobed by an ALE signal from the microprocessor 52. PROM/RAM select logic 62 uses address bits A14 and A15 from the microprocessor 52 to decode a one-to-four selector. The select logic 62 determines which of the several PROMs 64 and RAMs 66 are to be elected and may comprise a Texas Instruments F139 one-to-four decoder of the type listed in the TTL Data Book, Vols. 1-4, 1984, copyright 1984 by Texas Instruments, Inc.

An interval timer 60 is provided which is connected to the data bus 48 and may comprise, for example, an Intel 8254 program interval timer chip. The interval timer 60 reads preselected time intervals stored in the RAM 66 and is enabled to commence timing by a CTCEN signal after the fault has been inserted. When the interval timer 60 counts the preselected time interval, a time-out error signal (TOERR) is produced which sets a bit in a status register 68 of the fault select logic circuit shown in FIG. 3.

Referring now particularly to FIG. 3, device select logic 72, which includes a TI F139 and a TI F374 D to Q flip/flop coupled to the select logic of the F139, is provided which functions to decode address signals from the microprocessor 52 via the data bus 48 and outputs a set of signals which determine which register or peripheral device has access to the microprocessor 52. A clock gate generator 74 comprises 4D-type flip-flops which are used as a leading edge detector upon receipt of SHIFT8 or CIRCU8 signals derived from an instruction decoder 78. The clock gate generator 74 develops an 8CLKGT signal.

The status register 68 may comprise a TI F374 D to Q flip/flop microcircuit which stores bits corresponding to various errors which are recorded in the system. The status register 68 stores a BCTERR signal received from the bit counter 92 (FIG. 3) indicating that more than four faults have been simultaneously inserted into the FLTA 36 (FIG. 1). On the fifth signal, the self-test error bit BCTERR will be set. A STERR input line registers an error for self-testing procedures. A TOERR error signal is received from the interval timer 60 when the latter times out. A CLKSPD signal selected by the operator indicates which of two clock speeds the system is running at, and TESTSEL signal also is set by the operator toggling a manual switch during testing procedures where the operator wishes to individually test various parts of the system.

The instruction register 76 is connected to the data bus 48 and may comprise a flip-flop chip, such as a TI F374 microcircuit, which is configured to function as a latch. The instruction register 76 receives instructions from the microprocessor 52 to load various registers in preparation to insert the faults. An instruction decoder 78, such as a TI F138 one-to-eight decoder, connected to the output of the instruction register 76, is a three-bit to eight-bit decoder, such as a TI F138 microcircuit, and functions to decode the instruction bits in order to determine which output on the chip is selected. A port decoder 80, such as a TI F155 one-to-four DEMUXER which operates as a two-bit to four-bit decoder which uses PORTSELA and PORTSELB signals received from the instruction register 76 to determine which port receives operational data and clock signals.

A test adapter data register 90 such as a TI F299 which comprises an eight-bit parallel in-serial out shift/storage register which is controlled by the microprocessor 52 using read and write (RD/WR) signals received from microprocessor 52. The data register 90 stores an eight-bit pattern corresponding to the pin (circuit) of the TA 36 into which the fault is to be inserted. The eight-bit pattern is read into the register 90 from the data bus 48 upon receipt of a TADREN enabling signal received from the device select circuit 72. The eight-bit pattern is read from the register 90 onto an SFNDA signal line as well as an FMDTLB signal line which delivers such data to the bit counter 92, such as a TI F109, and port serial data select chip 70, such as a TI F151 eight-to-one MUX. Data on the data bus 48 corresponding to the type and level of the fault is delivered to a fault data latch 94, such as a TI F374, and thence on a FDR bus to a fault data driver 96 such as a TI F240 octal buffer. The outputs of the fault data driver 96 delivered to later-discussed analog circuits which deliver the analog signals to the TA 36 (FIG. 1) for insertion in the circuits of the UUT 24. The FDR0, FDR1, FDR2 signals output from the fault data driver 96 represent eight distinct fault current levels. The FDR3 signal indicates whether the fault is high or low, and the FDR4 signal corresponds to a fault type where two, three, or four pins of the UUT 24 are shorted together.

Figure 4:
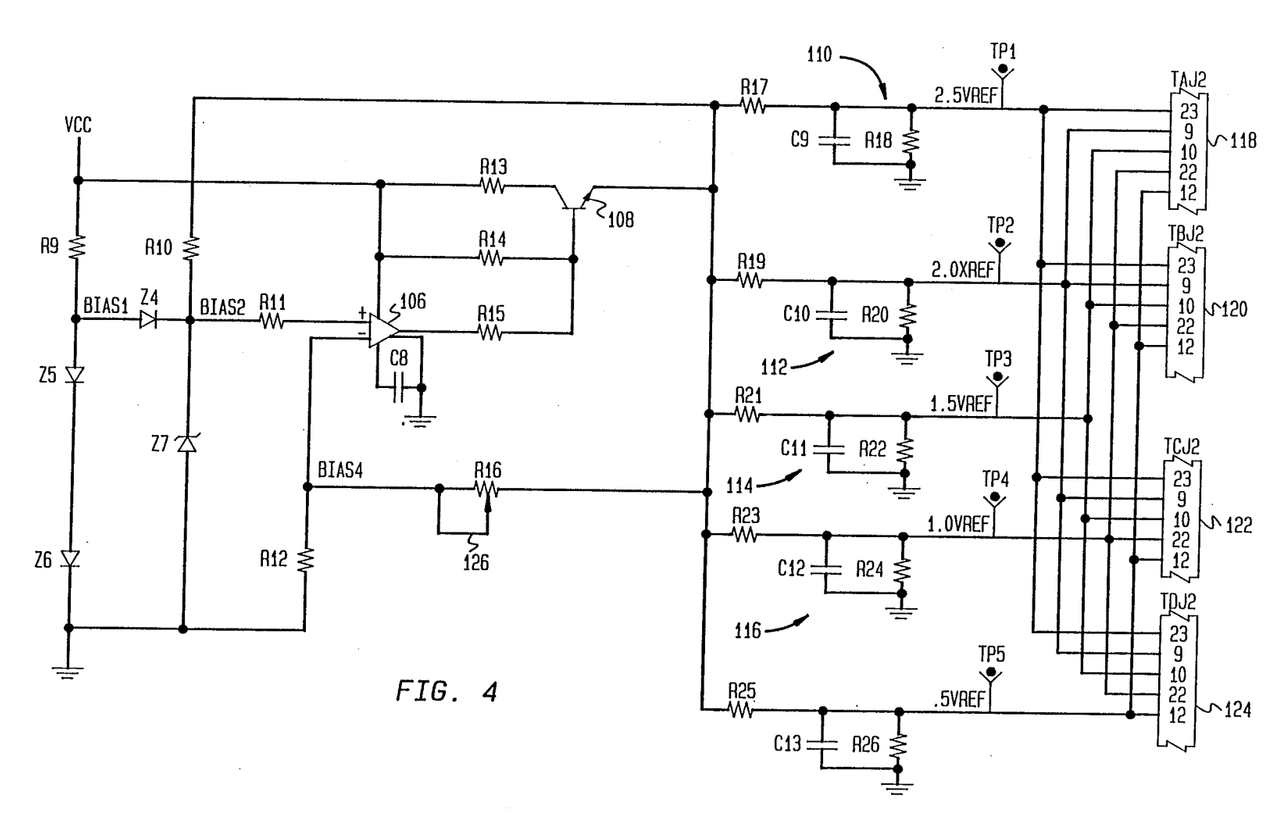
FIG. 4 is a detailed schematic diagram of the analog circuits portion of the automatic fault insertion unit shown in FIG. 3.
Figure 5:
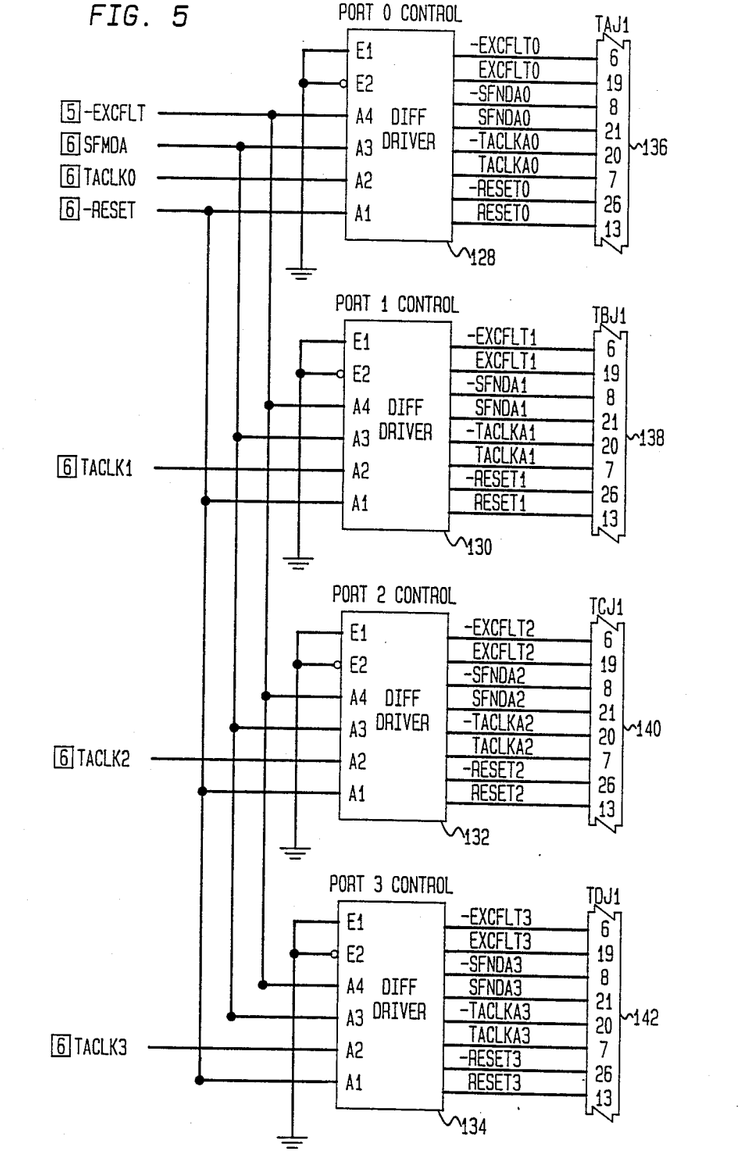
FIGS. 5-7 are more detailed circuit diagrams of a port interface portion of the automatic fault insertion unit.

An analog circuit 98, details of which are depicted in FIG. 4, establishes five voltages or voltage ranges which are monitored by the threshold detection register 100, such as a TI F374 microcircuit, to assure that the proper fault voltages are being applied to the UUT 24. As shown in FIG. 4, the analog circuit includes a plurality of RC circuits 110-116 which are respectively connected to interconneting corresponding junctions 118-124 of the TA 36. The voltage signal is applied to the junctions 118-124 through the RC circuits 110-116 by way of a switching transistor 108 whose collector-to-emitter path is connected with a positive source of voltage source. The base of the transistor 108 is controlled by the output of a comparator 106. The inverting input of comparator 106 is connected with a potentiometer 126 which determines the switch point of comparator 106. A port interface 104 (FIG. 3) is provided which interconnects the AFIU 34 with the TA 36. Details of the port interface 104 are shown in FIG. 5. The port interface 104 includes four differential drivers, each of which may comprise an AMD 26LS 31 differential driver, which functions to select the particular port or pin of the corresponding TA input/output connector 136-142 to which signals are delivered or from which signals are received.

Figure 6:
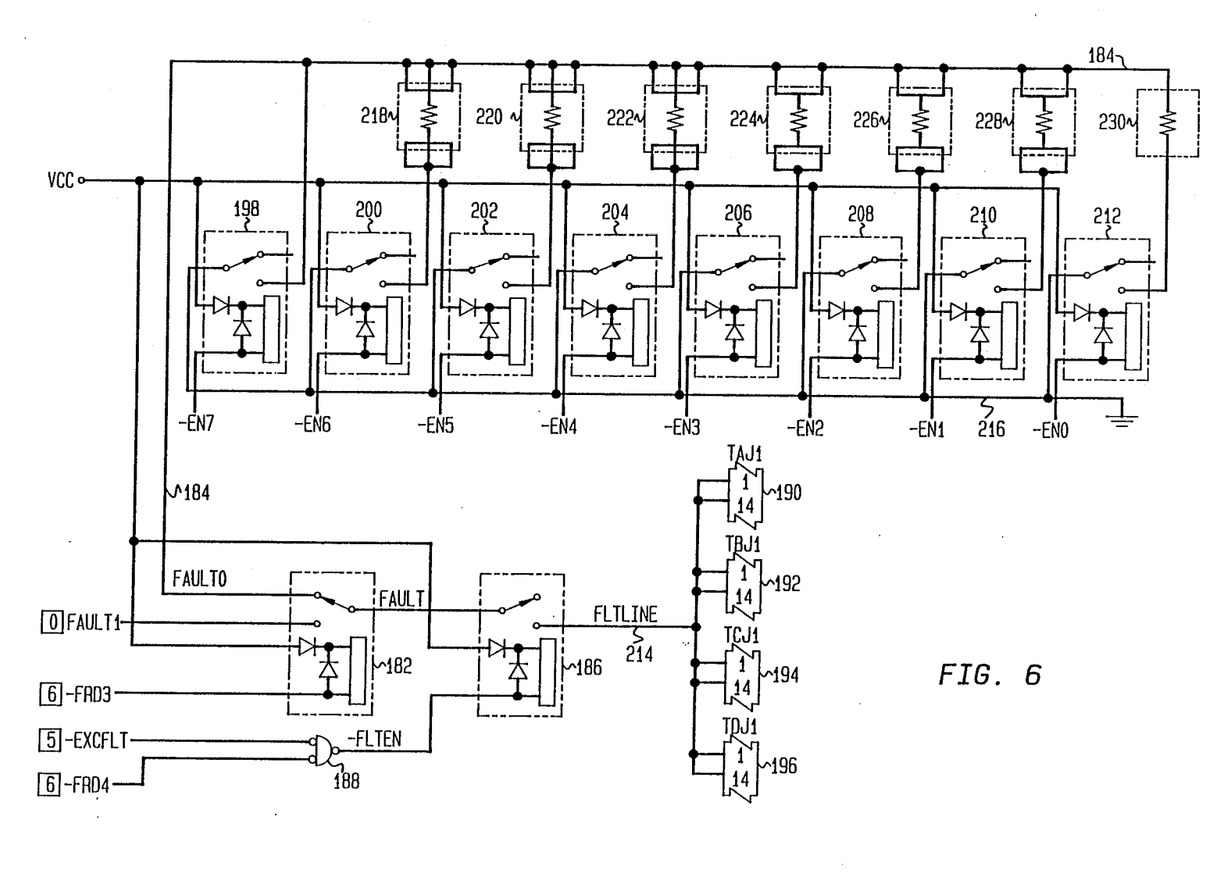
Figure 7:
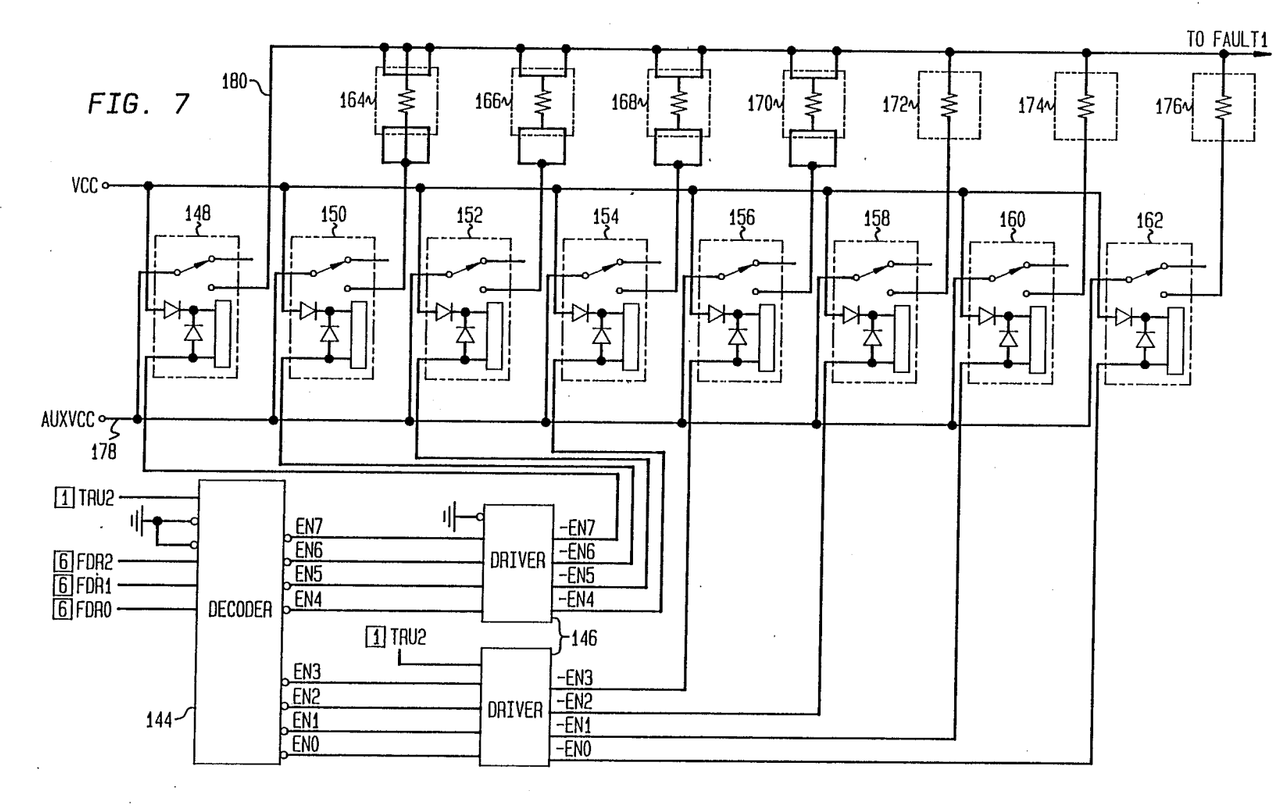

Additional details of the port interface 104 are depicted in FIGS. 6 and 7. As shown in FIG. 7, the three bits of data, FDR0, FDR1 and FDR2, which determine the current level of the fault signal to be applied, are delivered to the input of a three-to-eight decoder 144 such as a TI F138 microcircuit which produces eight enabling signals EN0-EN7 at its output. These enabling signals are delivered through drivers 146 to the control inputs of eight relays 148-162 shown in FIG. 7 and eight relays 198-212 shown in FIG. 6. The relay contacts of relays 150-162 are respectively connected between a voltage source on line 178 and respectively associated resistors 164-176 which determine the current level supplied from line 178 to a FAULT1 line indicated by the numeral 180. The relay contacts of relay 148 are connected directly between supply line 178 and FAULT1 line 180 so as to supply the full value of the supply line 178. It may thus be appreciated that the current level on the FAULT1 line 180 is determined by the particular relay 148-162 and associated resistors 164-176 that is actuated, which in turn is determined by the character of the three input bits to the decoder 144.

Referring now particularly to FIG. 6, eight different levels of ground faults are applied through line 184. These different levels of ground faults are produced by relays 200-212 which connect line 184 to a ground line 216 through corresponding resistors 218-230, which of course have differing values to produce different levels of ground signals. A relay 198 is also provided to connect line 184 directly to the ground line 216. Thus, the level of current sourced by line 184 is controlled by selection of relays 198-212. The relays 198-212 are controlled by enabling signals, EN0-EN7, received from the driver and which also function to enable relays 148-162 (FIG. 7) as discussed earlier.

Relay 182 is controlled by the FDR3 signal output from fault data driver 96 (FIG. 3). In one position, relay 182 connects fault line 184 (FAULT0) to relay 186, while in the other position it connects fault line 180 (FAULT1) to relay 186. Relay 186 is controlled by a high signal received from the output of an OR gate 188 whose inputs in turn receive an EXCFLT (execute fault) signal from the instruction decoder 78 (FIG. 3) and an FDR4 signal output from the fault data driver 96 (FIG. 3). When relay 186 is enabled, it routes the FAULT0 or FAULT1 fault signal to the fault line 214 (FLTLINE). Fault line 214 applies the fault signal to input/output interconnections 190-196 where the fault signal is routed to one to four test adapters 36.

Figure 8:
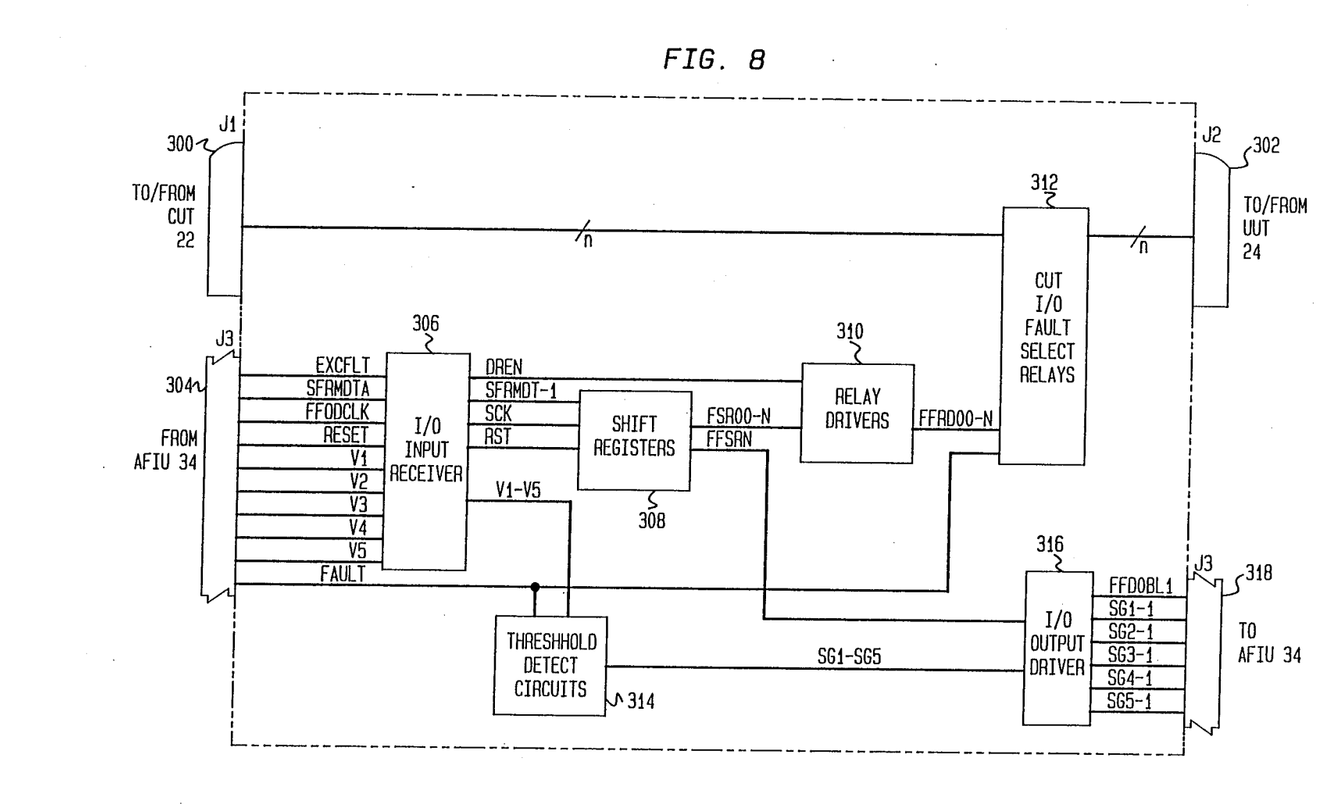
FIG. 8 is a block diagram of a test adapter.

Attention is now directed to FIG. 8 which depicts in block diagram form the details of a typical test adapter (TA) 36. The TA 36 is inserted between the connector of the card under test (CUT) 22 and the mating connector as the unit under test (UUT) 24. Thus, the TA 36 extends the CUT 22 from the UUT 24 in a fashion similar to a card extender. All CUT 22 input/output (I/O) signal lines pass through the TA 36, entering and exiting the TA 36 on connectors J1 300 and J2 302. The TA 36 may have any number of signal lines to accommodate the CUT 22 and are depicted by "n" signal lines in FIG. 8. Each CUT 22 signal line has an associated CUT I/O fault select relay 312. A relay 312, when selected, applies the FAULT signal from the AFIU 34 via TA 36 connector J3 304 to its associated CUT 22 signal lines.

The I/O input data receiver 306 is used as the communication link between the AFIU 34 and test adapter 36. The data receiver 306 may comprise a 26LS32 differential receiver.

Shift register 308, which may be 54LS164 microcircuits, are used to store the serial bit pattern, signal SFRMDT-1, sent from the AFIU 34 to the TA 36. The serial bit pattern contains the bit, or bits (4 maximum) which designate the relay, or relays (4 maximum), which are to be actuated during fault insertion. The serial data is clocked into the shift registers 308 by the leading edge of the SCK signal. The shift registers 308 may be reset upon command by the AFIU 34 via the RST signal line.

The relay drivers 310 receive the parallel output of the shift registers 308 and provide power buffering of these signals to the CUT I/O fault select relays 312 upon receiving the DREN signal.

The CUT I/O fault select relays 312 are connected to the CUT 22 signal lines. When the relays 312 are in the inactive state, the CUT 22/UUT 24 signals pass unchanged through the TA 36. However, if one or more relays is actuated, the AFIU prescribed fault signal is connected through the appropriate relay 312 to the CUT 22/UUT 24 signal line. Actuation of these relays is under the control of the relay drivers 310.

Threshold detect circuits 314 receive five reference voltages, V1-V5, from the AFIU 34. The threshold detect circuits 314 monitor the FAULT signal line and compare the voltage on the fault signal line to the reference voltages. This comparison may be accomplished, for example, utilizing two LM139 operation amplifiers. The outputs of the threshold detection circuits 314, SG1-SG5, are passed to the I/O output driver 316 circuits.

The I/O output driver 316 circuits may comprise 4-bit non-inverting differential drivers. These circuits transmit the detected threshold voltage level signals (SG1-1 through SG5-1) and the serial data (FFODBL1) to the AFIU 34 via TA 36 connector J3 318. The I/O output driver 316 circuits are always enabled.

Having thus described an embodiment of the invention, it is recognized that those skilled in the art may make various modifications or additions to the preferred embodiments chosen to illustrate the invention without departing from the spirit and scope of the present contribution to the art. Accordingly, it is to be understood that the protection sought and to be afforded hereby should be deemed to extend to the subject matter claimed and all equivalents thereof fairly within the scope of the invention.

What is claimed is:

1. A system for introducing faults into an electrical system of the type having at least one circuit assembly releasably connected to the system by a set of electrical interconnections, said circuit assembly having a plurality of circuits, and for comparing those faults against the faults detected and located by a testing means for testing the circuits for electrical faults, comprising:
fault signal introducing means connected between said at least one circuit assembly and said electrical system for automatically introducing electrical fault signals into selected circuits of said circuit assembly to simulate faults in said electrical system or said circuit assembly;
host processor means for selecting the circuits in which said fault signals are to be introduced and for providing electrical parameters of said fault signals;
wherein said fault signal introducing means is also for automatically controlling the magnitude of each of the fault signals in accordance with said electrical parameters of said host processor means;
means for monitoring said introduced fault signals to verify that a valid fault is introduced; and
wherein said host processor means is also responsive to said monitoring means and for comparing the faults detected by said testing means for testing the electrical system to the faults inserted by said fault signal introducing means to monitor the performance of said testing means.

2. The system of claim 1, including adapter means connected with each of said electrical interconnections for coupling each of said electrical circuits with said fault signal introducing means.

3. The system of claim 1, wherein:
said host processor means includes:
a first computer for selecting the electrical circuit into which a fault signal is to be introduced, said first computer including first memory means for storing a set of data corresponding to the identity of the electrical circuit in which a fault signal is to be inserted and to the character of the fault; and
said fault signal introducing means includes a second computer under control of said first computer for controlling the introduction of fault signals into the electrical circuit, said second computer including second memory means for receiving said data from said first memory means.

4. The system of claim 1, wherein said fault signal introducing means includes means for a voltage into any of said circuits simulating a fault, and threshold detection means for detecting whether the applied voltage falls below a threshold value during a preselected time period while the circuits are being tested.

5. The system of claim 4, wherein said fault signal introducing means includes means for a record indicating that said applied voltage has fallen below said threshold value.

6. The system of claim 1, wherein said fault signal introducing means includes means for limiting the current of said fault signal to any of a plurality of preprogrammed values.

7. The system of claim 1, wherein said fault signal introducing means includes means for limiting the number of fault signals that may be simultaneously introduced into said circuits.

8. The system of claim 7, wherein said limiting means includes a counter for maintaining a count of the number of faults introduced into said circuits.

9. The system of claim 1, wherein said fault signal introducing means includes means for removing all of said fault signals from said circuits after a preprogrammed time interval.

10. The system of claim 1, wherein said host processor means includes means for recording the performance of said testing means for testing the electrical system in testing for the faults simulated by said fault signals.

11. The system of claim 1 wherein:
said host processor means includes memory means for storing data therein corresponding to the character of the fault signal and the identity of the circuit into which the fault signal is to be introduced;
said fault signal introducing means includes means for converting the data stored in said memory means into a fault signal; and
said host processor includes a central processor connected with said memory means and with said converting means for controlling the transfer of data from said memory means to said converting means.

12. The system of claim 11, including a plurality of electrically responsive switch means controlled by said fault introducing means for selectively connecting said circuits with said converting means.

13. A system for testing a test controller means used for testing for faults an electrical unit of the type having at least one circuit connected to the unit by an electrical connection, by introducing a fault into the unit at a point between the circuit and the unit and monitoring the performance of the test controller means in its detection and location of said fault, said system comprising:
host processor means for selecting a fault to be introduced into the unit and for providing electrical signals representative of the electrical parameters of said selected fault;
fault insertion means for receiving from the host processor means the electrical parameters signals of said fault and for providing electrical fault signals corresponding to said electrical parameter signals to a point between said circuit and said unit to simulate faults in said electrical unit or said circuit;
test controller means for detecting and locating faults occurring in said electrical unit and for providing signals representative of the detection and location of said faults;
means for monitoring the inserted fault signals to verify that a valid fault is inserted; and
wherein, said host processor means is also responsive to said monitoring means, and is for receiving the detection and location fault signals provided by the test controller means and comparing said fault signals to the fault selected by the host processor means.

14. The system of claim 13 wherein the fault insertion means monitors and controls the application of the inserted fault to the circuit so that a predetermined magnitude and duration are not exceeded.

15. The system of claim 14 wherein the fault insertion means comprises current limiting means for limiting the amount of current applied to said point during the insertion of a fault.

16. The system of claim 15 wherein the current limiting means contains a plurality of selectable current level limiters, one of which is selected by the fault insertion means.

17. The system of claim 14 wherein the fault insertion means comprises counter means for limiting the number of faults inserted simultaneously to the unit.

18. The system of claim 14 wherein the fault insertion means comprises timer means for monitoring the duration of time during which a fault has been inserted and for removing said applied fault when the amount of time applied exceeds a predetermined limit.

19. The system of claim 14 wherein:
the fault insertion means applies a predetermined voltage to said point to insert a fault, and
said monitoring means comprises threshold means for detecting whether said applied voltage crosses a predetermined voltage level and in the event that said applied voltage does cross said predetermined voltage level, for providing a signal to said host processor means indicating that said inserted fault crossed said threshold.

20. The system of claim 19 wherein the host processor is also for preparing a report summarizing the faults introduced and the faults detected and located by the test controller means.

21. A system for testing a test controller means used for testing for faults an electrical unit of the type having at least one circuit connected to the unit by an electrical connection, by automatically introducing a series of faults into the unit at a point between the circuit and the unit and monitoring the performance of the test controller means in its detection and location of said faults, comprising:
host processor means for selecting a series of faults to be introduced into the unit in accordance with preprogrammed instructions and for providing electrical signals representative of the electrical parameters of said selected faults;
fault insertion means for receiving the electrical parameters of the series of faults to be introduced from the host processor means and for applying electrical fault signals in response to those parameter signals to a point between said circuit and said unit to simulate a fault in said unit or said circuit, said fault insertion means comprising:

threshold means for detecting whether voltage applied to said point during said fault insertion crosses a predetermined voltage level and in the event that said applied voltage does cross said predetermined voltage level, for providing a signal to said host processor means indicating that said inserted fault crossed said threshold;
current limiting means for limiting the amount of current applied to said point during the insertion of a fault;
counter means for limiting the number of faults inserted simultaneously to the unit; and
timer means for monitoring the duration of time during which a fault has been inserted and for removing said applied fault when the amount of time applied exceeds a predetermined limit; and
test controller means for detecting and locating faults occurring in said electrical unit and for providing signals representative of the detection and location of said faults;
wherein, said host processor means is also for receiving the fault signals provided by the test controller means and comparing those fault signals to the faults selected by the host processor means and providing a report of said comparisons.

22. The system of claim 21 wherein said fault insertion means is also for selectively applying a plurality of different levels of ground faults to said unit.

23. The system of claim 1 wherein said fault signal introducing means includes means for introducing a selectable fault signal current level to a selected one of said circuits to simulate a fault, and wherein said electrical parameter signals define the selected current level.

24. The system of claim 13 wherein said fault insertion means includes means for introducing a selectable fault signal current level at said point to simulate a fault, and wherein said electrical parameter signals define the selected current level.

25. The system of claim 21 wherein said fault insertion means includes means for introducing a selectable fault signal current level at said point to simulate a fault, and wherein said electrical parameter signals define the selected current level.

* * * * *